United States Patent [19]

Ungchusri et al.

[11] Patent Number: 4,927,192
[45] Date of Patent: May 22, 1990

[54] PIPE CONNECTOR LOAD ELEMENT

[75] Inventors: Tep Ungchusri, The Woodlands; George D. Lemons, Stephenville, both of Tex.

[73] Assignee: FMC Corporation, Chicago, Ill.

[21] Appl. No.: 372,807

[22] Filed: Jun. 29, 1989

[51] Int. Cl.$^5$ .............................................. F16L 19/02
[52] U.S. Cl. .................................. 285/305; 285/334.2; 285/353; 285/388; 285/924
[58] Field of Search ................ 285/388, 387, 305, 353

[56] References Cited

U.S. PATENT DOCUMENTS

| | | | |
|---|---|---|---|
| 2,065,740 | 12/1936 | Reed | 285/305 X |
| 2,967,068 | 1/1961 | Gressel | 285/388 X |
| 3,334,929 | 8/1967 | Wiltse | 285/305 |
| 4,050,722 | 9/1977 | Berger et al. | 285/388 X |
| 4,052,091 | 10/1977 | Bowden | 285/305 |
| 4,146,252 | 3/1979 | Buda | 285/305 X |
| 4,293,148 | 10/1981 | Milberger | 285/305 X |
| 4,498,874 | 2/1985 | Pichl | 285/305 X |

FOREIGN PATENT DOCUMENTS

| | | | |
|---|---|---|---|
| 261305 | 5/1963 | Australia | 285/353 |
| 501895 | 4/1954 | Canada | 285/305 |
| 1310712 | 10/1962 | France | 285/305 |

Primary Examiner—Thomas F. Callaghan
Attorney, Agent, or Firm—Lloyd B. Guernsey; R. C. Kamp

[57] ABSTRACT

A pipe connector load element interconnects a pipe element and a connector retention member. The load element is mounted in an annular groove on the outer circumference of the pipe element and in a groove adjacent to an internal bore in the retention member to secure the retention member to the pipe element. The load element includes a plurality of elongated components each having a slot extending lengthwise, and a flexible ribbon for threading through the slots. A pair of retention members are interconnected to connect a pair of pipe elements in an end-to-end arrangement.

4 Claims, 3 Drawing Sheets

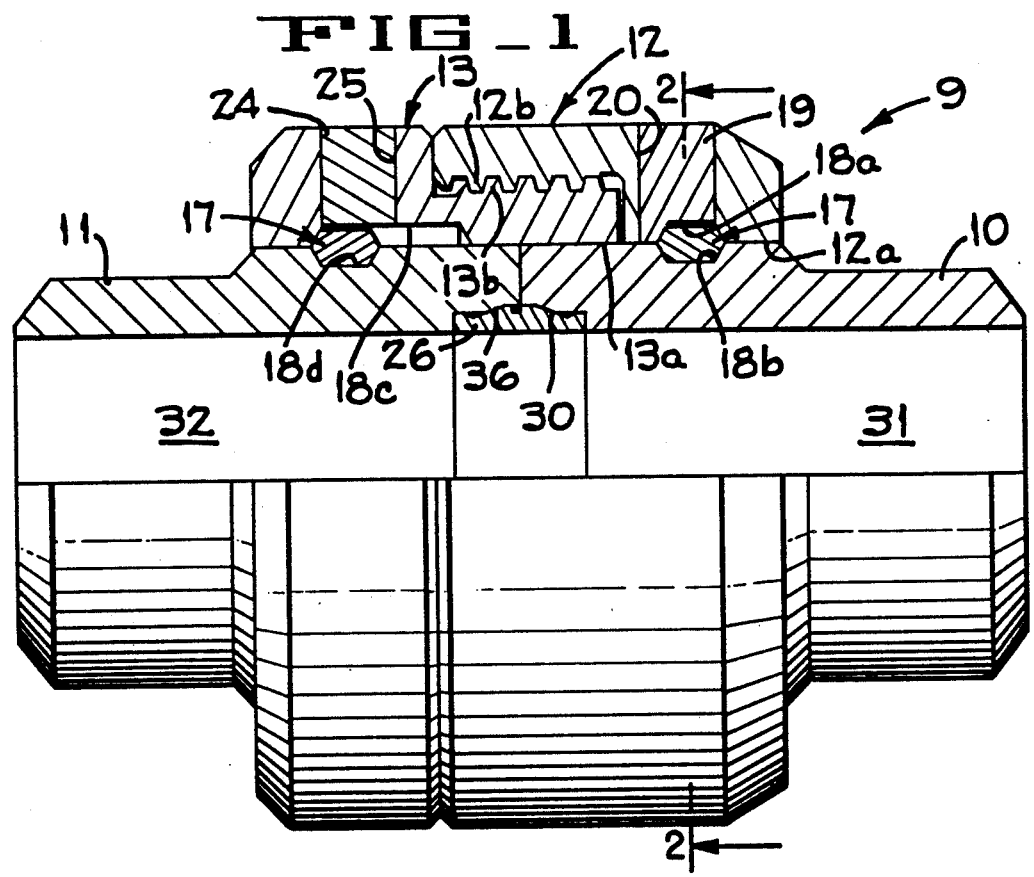
FIG_1
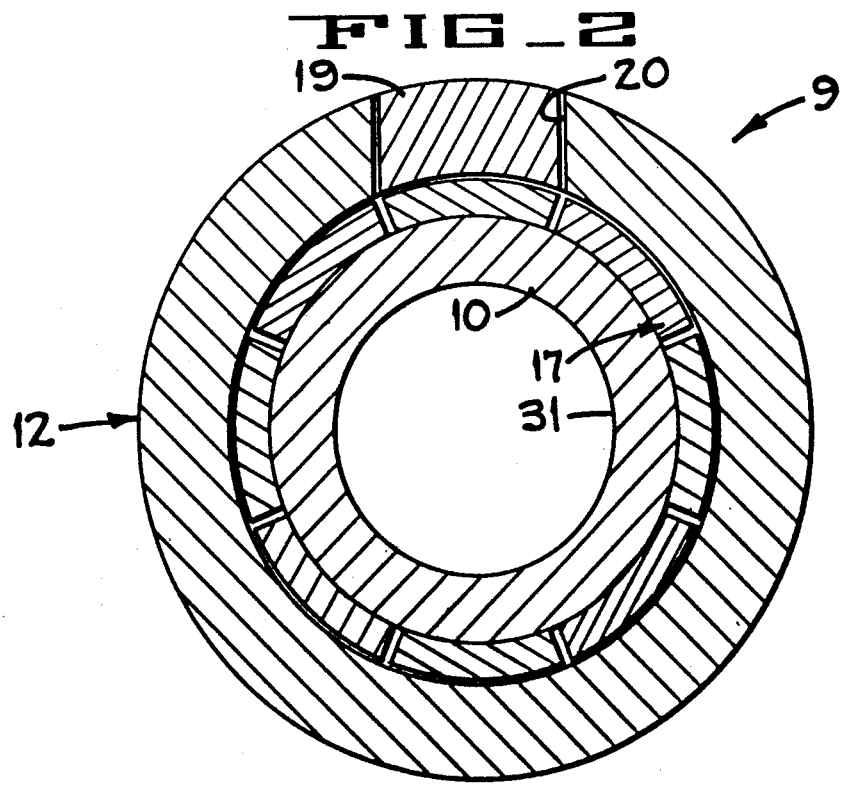
FIG_2

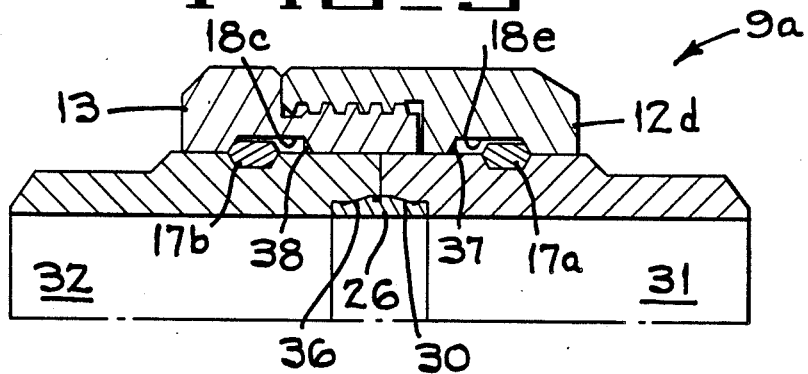
FIG_3
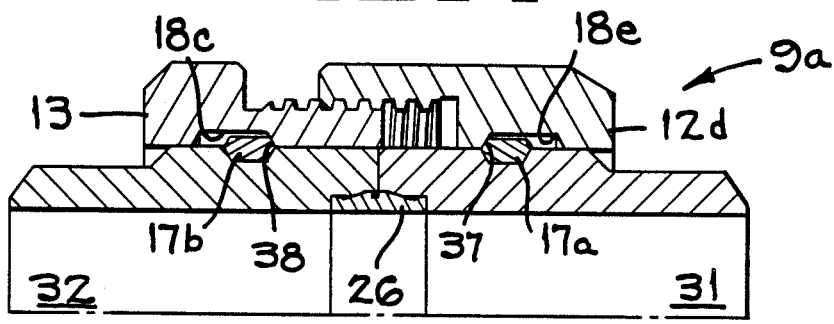
FIG_4
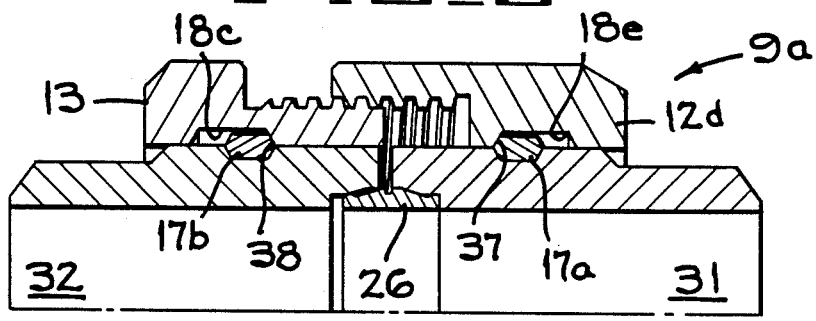
FIG_5
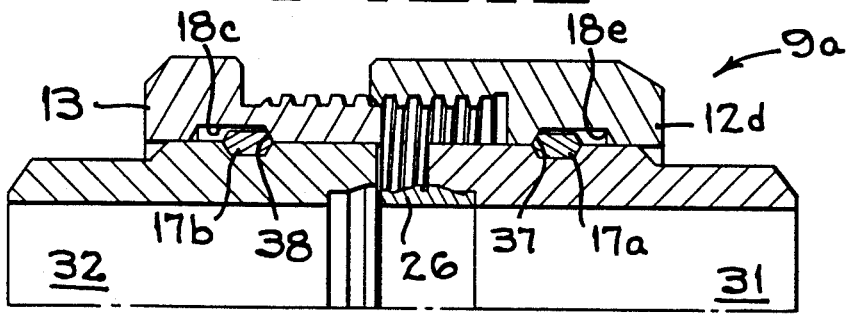
FIG_6

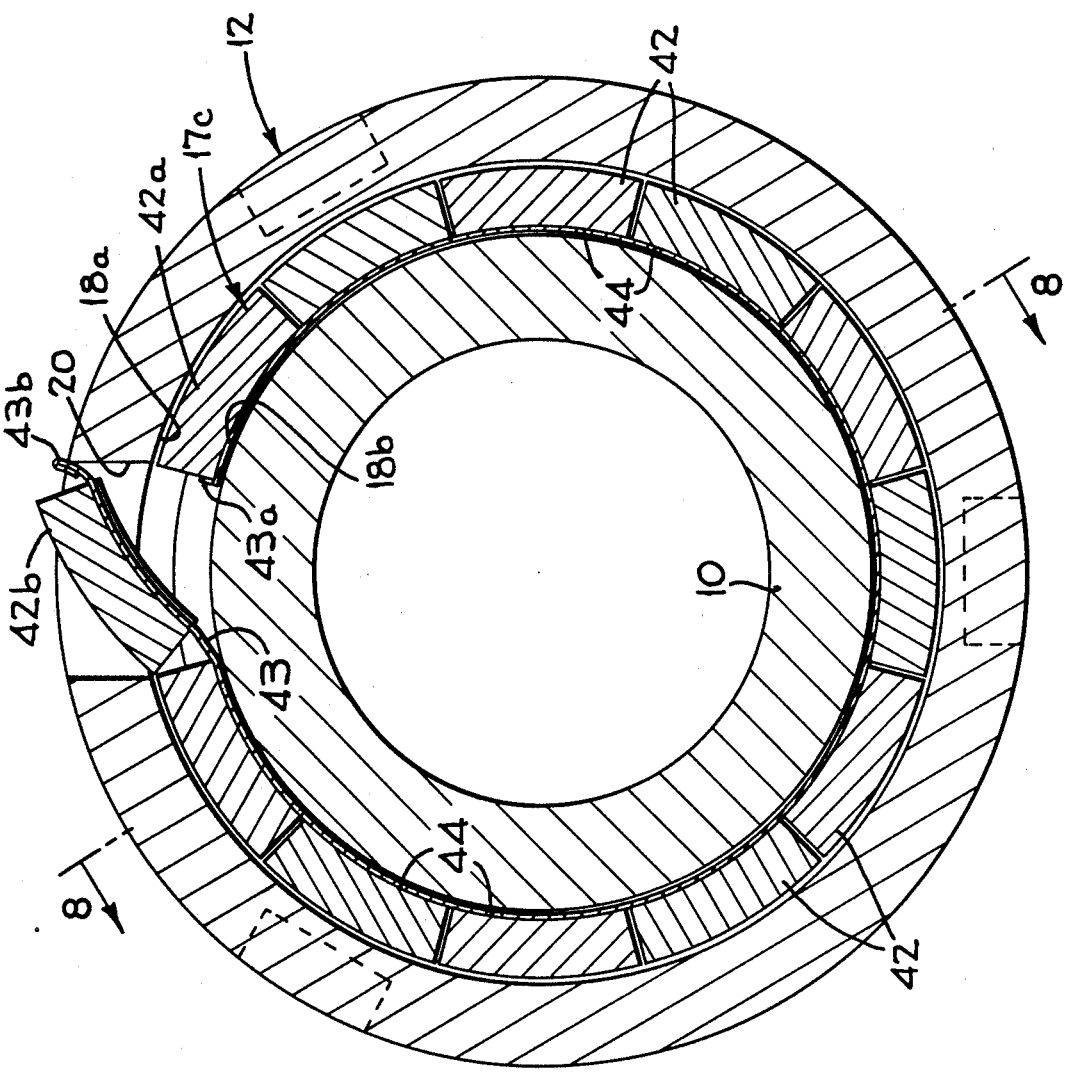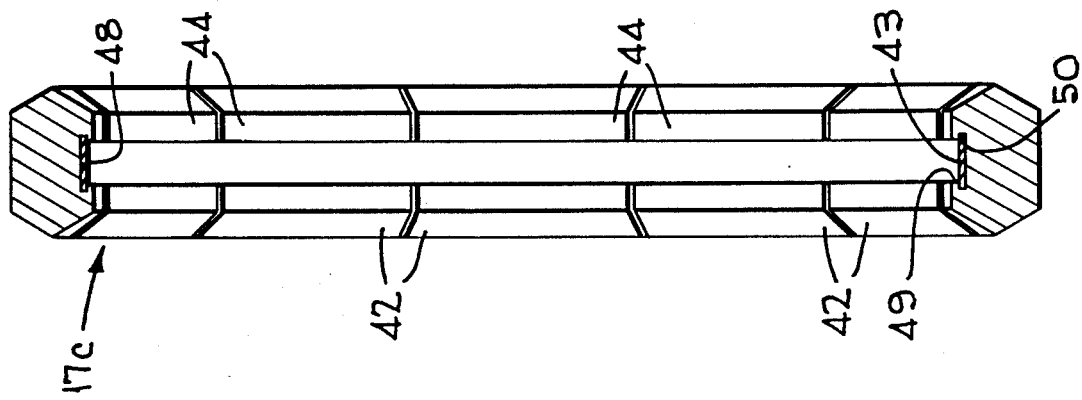

PIPE CONNECTOR LOAD ELEMENT

BACKGROUND OF THE INVENTION

This invention relates to pipe connector devices, and more particularly, to such connector devices for use in temporary and quasi-permanent pipe flowlines.

Temporary and permanent flowlines are commonly used in production, drilling, cementing, stimulation, injection and testing of oil and gas wells. Flexible devices with quick connections at the ends provide a quick and convenient layout of the piping system and provide fluid tight seals between the mating pipe element members. Some of the flexible devices used are swivel joints, hoses, composite structure pipe, and ball joints. Seals and separate connections are required at each end of the device. Connections include hammer type unions, flanges, clamps, specialty couplings, and pipe threads.

SUMMARY OF THE INVENTION

The present invention discloses a load element for use in a pipe connector device that can selectively serve as a swivel joint and as a pipe connector. The connector device reduces the number of seal leak paths in the total piping system; reduces the number of variations in pipe elements required; enhances the utility of individual pipe elements; and reduces the cost of pipe elements required. A pair of pipe retention members each have an internal bore for receiving one of a pair of pipe elements. Each of the retention members is secured to a corresponding one of the pipe elements by a load element.

The load element includes a plurality of elongated components each having a slot extending lengthwise along the component. A flexible ribbon is threaded through the slots to mount the components in an end-to-end arrangement on the ribbon. The slots are in the form of a "T" with a stem of the "T" perpendicular to a bottom portion of each of the components and with a cross-bar of the "T" parallel to the bottom portion of the components. The flexible ribbon is threaded through the cross-bar portion of the slot to prevent the components from becoming unthreaded from the ribbon. The load element is mounted in a groove in the outer circumference of a pipe element and in a groove adjacent to the internal bore of a retention member to secure the pipe element to the retention member.

The retention members are interconnected by pipe threads or other means to secure the pipe elements in a fixed end-to-end relationship. The retention members can be interconnected with the pipe elements positioned a distance apart and the retention members rotated relative to each other to pull the pipe elements into tight alignment. The retention members can be readily disconnected from the pipe elements by merely removing the load elements and the retention members removed from the pipe elements. A seal is connected at the junction of the pipe elements to prevent leakage at the junction. When a pair of threaded nuts are used as the retention members the joined pipe elements can be identical thereby reducing the number of different elements to be manufactured. The profile of the pipe elements of the present invention is small compared to unions and similar devices in prior art connectors.

BRIEF DESCRIPTION OF THE DRAWINGS

FIG. 1 is a side elevation, partly in section, of one embodiment of a pipe connector in which the present invention can be used.

FIG. 2 is an end section of the pipe connector of FIG. 1 taken along line 2—2 of FIG. 1.

FIGS. 3-6 are partial sections of another embodiment of the pipe connector of FIG. 1 showing a sequence of disconnecting the pipe elements.

FIG. 7 is an enlarged side elevation, partly in section of an embodiment of a pipe connector showing details of the load element of the present invention.

FIG. 8 is an end section of the load element taken along line 8—8 of FIG. 7.

DESCRIPTION OF THE PREFERRED EMBODIMENT

FIGS. 1, 2 disclose a pipe connector device 9 which uses the load elements of the present invention. The pipe connector device includes a pair of pipe elements 10, 11 interconnected by a pair of retention members 12, 13 and a pair of load elements 17. Pipe elements 10, 11 are mounted in an internal bore 12a, 13a of the retention members 12, 13 and secured to members 12, 13 by load elements 17, each mounted in a pair of grooves 18a, 18b and 18c, 18d.

To assemble connector device 9, member 12 is positioned about pipe element 10 with groove 18a adjacent to groove 18b and member 13 is positioned about pipe element 11 with groove 18c adjacent to groove 18d. A plug 19 is removed from a bore 20 of member 12 and a load element 17 is fed through bore 20 into grooves 18a, 18b to secure member 12 to pipe element 10 and plug 19 is replaced in bore 20. A plug 24 is removed from a bore 25 and a load element 17 is fed through bore 25 into grooves 18c, 18d to secure member 13 to pipe element 11. Plug 24 is replaced in bore 25 to keep load element 17 in place. A sealing member 26 is placed in a portion of a cavity 30 adjacent to a center bore 31 of pipe element 10. Pipe elements 10, 11 are positioned with center bore 31 of pipe element 10 aligned with a center bore 32 of pipe element 11. Member 12 is rotated relative to member 13 so that a threaded portion 12b of member 12 mates with a threaded portion 13b of member 13 and draws pipe elements 10, 11 toward the position shown in FIG. 1. A portion of sealing member 26 moves into a cavity 36 adjacent to center bore 32 to provide a fluid tight seal between elements 10 and 11. Groove 18c is wider than groove 18d so that retention members 12, 13 can be partially threaded together before a rotation of member 12 relative to member 13 applies pressure to secure pipe elements 10, 11 in tight abutment.

Another embodiment of the present invention 9a disclosed in FIGS. 3-6 includes another wide groove 18e in retention member 12d. Plugs 19, 24, disclosed in FIGS. 1, 2, have been omitted from FIGS. 3-6 in order to simplify the drawings but it should be understood that such plugs are needed to install the load elements 17a, 17b.

When it is desired to disconnect pipe element 10 from pipe element 11, to replace seal 26 or for other reasons, member 12d is rotated relative to member 13 causing the members 12d, 13 to be spaced as shown in FIG. 4. Further rotation of member 12d relative to member 13 causes a shoulder 37 of groove 18e to press against a load element 17a and a shoulder 38 of groove 18c to press against a load element 17b to move pipe element 10 away from pipe element 11 as shown in FIG. 5. The slight separation of elements 10, 11 allows any internal pressure in bores 31, 32 to bleed off while threads 12b, 13b are still engaged and prevent elements 10, 11 from being blown apart. Still further rotation of retention member 12d allows pipe elements 10, 11 to be separated as shown in FIG. 6.

The forced separation of pipe elements 10, 11 due to rotation of members 12, 13 prevents elements 10, 11 from sticking together and facilitates seal replacement or dismantling of flowline systems.

In the embodiments disclosed in FIGS. 1–6 pipe elements 10, 11 are identical which simplifies manufacturing and reduces costs over connectors using unlike pipe elements. The load elements 17, 17a, 17b can also be identical to reduce costs.

Load element 17c (FIGS. 7, 8) includes a plurality of elongated components 42 each threaded on a flexible ribbon 43. Components 42 are segments of a hollow cylinder with an inner surface or bottom portion 44 (FIGS. 7, 8), having a radius which mates with groove 18b of pipe element 10. A T-shaped slot 48 (FIG. 8) extending lengthwise in components 42 includes a stem portion 49 generally perpendicular to bottom portion 44, and a cross-bar 50 at the upper end of stem portion 49. Cross-bar 50 is generally parallel to bottom portion 44 of components 42.

Flexible ribbon 43 is threaded through cross-bar 50 in slot 48 of each of the components 42 to facilitate moving load element 17c through bore 20 (FIG. 7) and into grooves 18a, 18b. Ribbon 43 can be made of a metal such as steel or can be plastic or fiber or other flat flexible material. A first end 43a (FIG. 7) is bent to ensure that a component 42a does not slid off the end of ribbon 43 as load element 17c is fed into grooves 18a, 18b and a second end 43b is similarly bent to retain a component 42b. A small weld or an enlargement at the end portions can also be used to secure the components 42 to the ribbon. Components 42 are free to slide a limited distance along the length of ribbon 43 to facilitate the movement of load element 17c through bore 20 as seen in FIG. 7.

The T-shaped slots in the load element components are relatively easy to machine and provides a secure means for connection to the flexible ribbon. The components can easily slide along the ribbon and into position in the grooves of the pipe elements and in the retention member grooves.

Although the best mode contemplated for carrying out the present invention has been herein shown and described, it will be apparent that modification and variation may be made without departing from what is regarded to be the subject matter of the invention.

What is claimed is:

1. A pipe connector load element for use in a pipe connector device having first and second pipe elements for connection in an end-to-end relationship, said first pipe element having a groove extending about the outer circumference of said first pipe element, a first retention member having an internal bore for receiving said first pipe element with said first retention member having a groove adjacent to said internal bore, means for selectively connecting said first retention member to said second pipe element, said load element being mounted in said pipe element groove and in said retention member groove to secure said pipe element to said retention member, said load element comprising:

a plurality of elongated components with each of said components being segments of a hollow cylinder with an inner surface of each of said components having a radius which mates with a groove in an outer circumference of a first pipe element, each of said components having a slot extending along a length of said component, said slot forming a "T" having a stem extending perpendicular from said inner surface and having a cross-bar at a top of said "T", said cross-bar extending parallel to said inner surface of each of said components; and a flexible ribbon extending through said cross-bar portion of said slot in each of said components to thread said components to said ribbon in an end-to-end arrangement.

2. A pipe connector load element as defined in claim 1 wherein said ribbon comprises a flat ribbon slidably mounted in said slot in each of said elongated components, said flat ribbon having an enlarged first end portion and an enlarged second end portion to ensure that said elongated components are securely mounted on said ribbon.

3. A pipe connector load element as defined in claim 1 wherein each of said elongated components is slidably mounted on said flexible ribbon.

4. A pipe connector load element as defined in claim 1 wherein said ribbon comprises a flat steel ribbon slidably mounted in said slot in each of said elongated components, said steel ribbon having a crimped first end portion and a crimped second end portion to ensure that said elongated components are securely mounted on said steel ribbon.

* * * * *